3,695,916
Patented Oct. 3, 1972

3,695,916
PROCESS FOR REGENERATING SURFACE ACTIVITY IN OXIDATIVELY TREATED GRAPHITE FIBERS
Roscoe A. Pike, Simsbury, Conn., assignor to United Aircraft Corporation, East Hartford, Conn.
No Drawing. Filed July 8, 1970, Ser. No. 53,273
Int. Cl. B44d 1/092; C01c 31/07
U.S. Cl. 117—47 R                                    3 Claims

ABSTRACT OF THE DISCLOSURE

A process for regenerating the surface activity in oxidatively treated graphite fibers adapted for reinforcing resin matrix composites to increase the strength properties of the composite comprising passing the graphite fiber through a dilute solution of an organic isocyanate in a low boiling solvent, the isocyanate consisting of a compound defined by the formula $R(NCB)_x$ wherein $x$ is an integer of 1 or more, B is an atom of sulfur or oxygen and R is a polyvalent organic radical having a valence of $x$ with the valence bonds being from hydrocarbon moieties, and drying the treated fiber in air.

BACKGROUND OF THE INVENTION

This invention relates to graphite fibers of the type suitable for use as a reinforcement in a composite material and more particularly relates to a method for regenerating surface activity in oxidatively treated fibers to improve the bond strength of a graphite yarn-resin matrix composite.

The fabrication of high shear strength resin-graphite composites for use in gas turbine engine applications is one of the important objectives of the aerospace industry. As is known, the strength of such composite material, and in particular the shear strength parallel to the fibers in cases where there is selective orientation of the fibers, is dependent at least partially on the nature of the bond achieved between the reinforcing fibers and the matrix. Techniques have been developed for improving the strength of the bond between the fibers and the matrix by oxidative processes such as for example those disclosed in copending applications Ser. Nos. 47,490 and 47,491 filed June 18, 1970 which are assigned to the present assignee and in U.S. 3,476,703. Additionally, there have been developed other treatment processes by which increased surface activity and hence improved composite strengths can be obtained.

Although the prior techniques are useful, it has been found that surface activity deteriorates in air due to aging unless a protective coating is provided. Unfortunately, the advantages of providing a protective coating are substantially lost if the coating is not identical with the composite matrix material to be used in the final process. It is recognized that it would be of particular advantage to one fabricating resin-graphite composites to dispense with the need for precoating a treated fiber altogether if a simple surface activity regeneration process could be effected just prior to composite fabrication.

SUMMARY OF THE INVENTION

It has been discovered that if an organic isocyanate is adsorbed on oxidatively treated graphite fibers whose surface activity has deteriorated, there will result a restoration of surface activity so as to cause an improvement in the strength properties of the graphite fiber when combined with the resin selected to form the composite. Although the exact mechanism by which the isocyanates function is imperfectly understood at the present time, it is believed to be associated wtih the amount of water and polar groups such as OH, COOH>C=O on the fiber surface. The surface of an aged fiber is contaminated with water which reacts strongly with the isocyanate to form an aromatic acid thus resulting in an increased wettability of the fiber surface by the resin.

The present invention contemplates the regeneration of surface activity in oxidatively treated graphite fiber which has been aged by drawing the fiber through a dilute solution of an isocyanate in a low boiling solvent at room temperature followed by air drying, either at room or slightly elevated temperatures, depending upon the solvent employed to dissolve the isocyanate and the time available prior to resin impregnation. The fiber is then subsequently processed in the usual manner to obtain a composite.

The organic isocyanate compounds suitable for use in the treatment are the oxyisocyanates or the thioisocyanates described by the general formula:

$$R(NCB)_x$$

wherein $x$ is an integer of 1 or more, preferably 1 through 3, B is a sulfur or oxygen atom and R is any polyvalent organic radical having a valence of $x$ in which the valence bonds are from hydrocarbon moieties. For example, R can be a single hydrocarbon moiety such as alkylene, substituted alkylene, arylene, substituted arylene, a hydrocarbon or substituted hydrocarbon containing one or more aryl NCB bonds and one or more alkyl NCB bonds, a hydrocarbon or substituted hydrocarbon containing a plurality of either aryl NCB bonds or alkyl NCB bonds. R can also include radicals such as —R'—Z—R'— wherein Z is any divalent moiety such as —O—, —O, —R, —O, —C—,

—S—, —S—R—S, —SO₂—, etc., and R' is a divalent hydrocarbon moiety such as alkylene, arylene, substituted alkylene substituted aralkylene, alkarylene and the like. Examples of suitable diisocyanate compounds are listed at columns 5 and 6 of U.S. Pat. 3,382,215 to Baum. It is to be appreciated that a listing of suitable monoisocyanates is the same except that the latter will contain only one isocyanate group with the other being replaced in the compound by hydrogen.

All of the above compounds, whether diisocyanate or monoisocyanate, are suitable for use with conventional low temperature resin systems such as epoxy, polyester, phenolic, acrylic and the like. For high temperature resin systems such as polyimide, polybenzimidazole, polybenzothiozole, polyoxadiazoles and the like, those isocyanates or isothiocyanates which contain only aromatic units are preferred for use. Suitable solvents include acetone, tetrahydrofuran and the like.

Treatment with the above isocyanates is considered effective on acrylonitrile base or rayon base graphite fibers. It will be appreciated that the term fiber is meant to include monofilament, continuous tow, staple, or micron length fibers.

In one series of investigation, 36 inch tows of commercially available unsized Morganite I-S yarn was treated and then incorporated into an epoxy matrix (Union Carbide 2256/0820 resin system). The short beam shear strength of an epoxy resin-graphite composite having 50 v./o. fiber averaged 8500–9000 p.s.i. when the fiber was new, that is when the fiber was used within 3 weeks of receipt from the manufacturer. The short beam shear strength of identical epoxy resin-graphite composites made using fiber that was aged 6–8 months averaged only 3500 p.s.i. In regenerating the activity of the aged yarn, the fiber was drawn through a dilute solution of an organic iscoyanate in acetone and then air dried with results as indicated in Table I.

TABLE I.—EFFECT OF ISOCYANATE TREATED GRAPHITE FIBER ON SHEAR STRENGTH OF EPOXY RESIN-GRAPHITE COMPOSITES

| Fiber treatment | Fiber content (v/o) | Isocyanate concentration (w/o) | Density (g./cc.) | Void content (v/o) | Short beam shear (p.s.i.) | Span/depth |
|---|---|---|---|---|---|---|
| Standard—none | .64 | | 1.77 | 0 | 2,540 | 4/1 |
| Do | 50 | | | | 3,500 | 5/1 |
| Do | 17 | | 1.31 | 3.1 | 6,990 | 4/1 |
| Toluene diisocyante | 30 | 1.0 | 1.40 | 3.3 | 9,586 | 4/1 |
| Do | 50 | 0.25 | | | 8,800 | 5/1 |
| Phenyl isocyanate | 50 | 0.25 | | | 8,800 | 5/1 |
| Isocyanate prepolymer [1] | 27.3 | 1.0 | 1.40 | 1.7 | 7,050 | 5/1 |
| Toluene diisocyanate | 50 | 0.50 | | | 6,500 | 5/1 |
| Phenyl isocyanate | 50 | 0.50 | | | 7,000 | 5/1 |

[1] Solithane 113 from Thiokol Co.

The broad thrust of the experiments is perceived as showing that the activity of aged yarn may be regenerated by adsorbing, from a 0.25–1.0 w./o. solution, an organic isocyanate on the fiber surface. Additional similar experiments with Morganite II–S fiber, while not as extensive as those above, have shown improved shear strengths after treatment.

Improvement in shear strength has also been found using isocyanate treated fiber in a polyimide resin-graphite composite. A shear strength of 7213 p.s.i. at 4/1 span-to-depth ratio was obtained for a standard using unsized Morganite I–S fiber while a shear strength of 7433 p.s.i. at 5/1 span to depth was obtained with a TDI treated Morganite I–S. It has been well established that a change in S/D from 5/1 to 4/1 results in at least a 1200 p.s.i. difference in shear strength for polyimide systems. Therefore it is foreseen that the TDI specimen measured at 5/1 would be at least 8633 p.s.i. if measured at 4/1.

What has been set forth above is intended primarily as exemplary to enable those skilled in the art in the practice of the invention and it should therefore be understood that, within the scope of the appended claims, the invention may be practiced in other ways than as specifically described.

I claim:

1. A process for regenerating surface activity in aged, oxidatively treated graphite fibers adapted for reinforcing resin matrix composites comprising:
prior to resin impregnation, adsorbing from solution an organic isocyanate on the fiber surface,
said isocyanate consisting of a compound selected from the group defined by the formula:

$$R(NCB)_x$$

wherein:

$x$ is an integer of 1 or more,

B is a sulfur or oxygen atom, and

R is a polyvalent organic radical having a valence equal to $x$ with the valence bonds being from hydrocarbon moieties, and, drying the fiber in air.

2. The invention of claim 1 wherein $x$ is an integer of 1 through 3.

3. The invention of claim 2 wherein the solution contains said isocyanate in a combination of .25–1.0% by weight.

References Cited

UNITED STATES PATENTS

| 3,529,934 | 9/1970 | Shirdo | 23—209.1 |
| 2,862,281 | 12/1958 | Klausner | 117—54 |
| 3,573,961 | 4/1971 | Hawkins et al. | 117—47 R |
| 3,196,035 | 7/1965 | Yanagihara | 117—54 |

WILLIAM D. MARTIN, Primary Examiner

W. R. TRENOR, Assistant Examiner

U.S. Cl. X.R.

8—115.6; 23—209.1; 117—161 P